June 21, 1955  R. P. HAVILAND  2,711,290
MULTIPLIER FOR COMPUTING DEVICES
Filed May 9, 1951
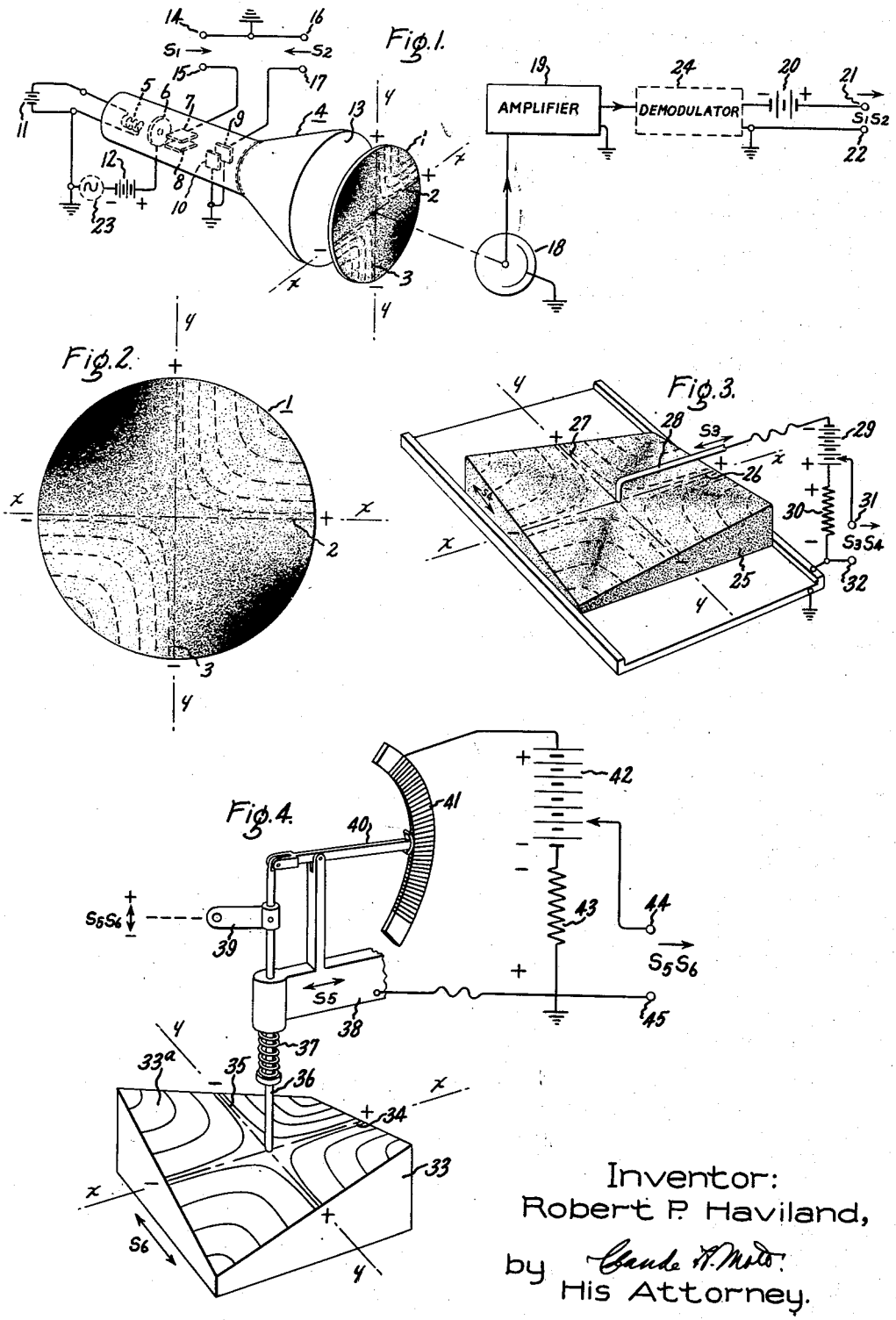
Inventor:
Robert P. Haviland,
by Claude A. Moto
His Attorney.

United States Patent Office 2,711,290
Patented June 21, 1955

2,711,290

MULTIPLIER FOR COMPUTING DEVICES

Robert P. Haviland, Scotia, N. Y., assignor to General Electric Company, a corporation of New York Application May 9, 1951, Serial No. 225,390

3 Claims. (Cl. 235—61)

My invention relates to computing devices such as analogue computers, differential analyzers, and the like, and, more particularly, to multiplying apparatus for such computing devices.

Computing and analyzing devices, such as analogue computers and differential analyzers, are often advantageously employed in solving scientific and engineering problems concerning inter-related physical phenomena, such devices yielding quick and accurate results on either a qualitative or quantitative basis for problems such as complex differential equations. Essentially, these computing devices are assemblies of a model electrical, mechanical, or electro-mechanical system, which is analogous to the physical system under study, or which follows the same governing mathematical relationships as the physical system under study. The components of the model systems are adjustable and flexible, so that, with slight adjustments, the systems can solve any of a great number of similar problems. The problems are often set up with time representing an independent variable and electrical, mechanical, or electro-mechanical signals representing dependent variables, some time-varying (and usually periodically repeating) driving signal being generated and impressed upon the model system and a resulting time-varying output signal being observed as the particular solution desired. Thus, one or more input signals to the system may be operated on by adding, integrating, differentiating, multiplying, and other mathematically acting components, and the resultant output signals taken from a cathode ray tube or a graph drawn by a mechanical linkage of the system.

In such computing devices as those described above, it is often necessary to multiply two dependent time-varying signals to produce a third time-varying signal proportional to their product. Components of computing devices for accomplishing this are known simply as "multipliers," since they do, in fact, multiply two time-varying input signals. Such multipliers employed heretofore have been lacking in one or more of the desirable features of a multiplier, for instance, four quadrant operation where one or both input signals may have negative or positive values, quick speed of response to allow the driving function and the problem solution to be repeated many times each second, an electrical output product signal resulting from mechanical input signals, and simplicity of construction.

It is, therefore, an object of my invention to provide a new and improved multiplier for computing devices.

It is another object of my invention to provide a multiplier which is simple and economical in construction.

It is still another object of my invention to provide a multiplier permitting four quadrant operation.

It is a further object of my invention to provide a multiplier having high speed of response.

And it is yet another object of my invention to provide a multiplier which produces an electrical output product signal in response to mechanical input signals.

In carrying out the foregoing objects of the invention, I provide a multiplier which may be adapted for use with electrical, mechanical, or electromechanical computing devices. Briefly stated, the multiplier of my invention includes an element having a property or characteristic varying in hyperbolic contours with respect to an arbitrary set of Cartesian axes thereon in a direction perpendicular to the plane of the axes and in each of the four compartments formed by the intersections of these axes. Means responsive to the varying characteristic or property of the element are adapted to be moved along one of the axes in accordance with a first time-varying input signal and along the other of said axes in accordance with a second time-varying input signal, the means producing in response a time-varying output signal proportional to the product of the two input signals.

The scope of my invention is pointed out with particularity in the appended claims. However, for a better understanding of the invention, together with further objects and advantages thereof, reference should be had to the following description taken in conjunction with the accompanying drawing, in which:

Fig. 1 is a schematic diagram, partly in block-and-line representation, of a first embodiment of my invention suited to have electrical input and output signals;

Fig. 2 is a detailed plan view illustrating more clearly the element or screen shown in Fig. 1;

Fig. 3 is a perspective view of a resistance element together with an associated schematic electrical circuit diagram illustrating a second embodiment of the invention suited to have mechanical input signals and an electrical output product signal, and Fig. 4 is a perspective view of a cam element, cam follower, and a mechanically variable resistor, together with an associated schematic electrical circuit diagram illustrating a third embodiment of the invention suited to have mechanical input signals and either or both mechanical and electrical output product signals.

Referring now to Figs. 1 and 2, I have shown a first embodiment of my invention which is an electrical multiplier particularly adapted for use with electrical computing devices such as electronic analogue computers. This electrical multiplier includes an element such as a screen 1, illustrated more clearly by Fig. 2, and having a characteristic, i. e., transparency, varied in all four quadrants in hyperbolic contours with respect to a set of rectangular Cartesian axes, such as an arbitrary X axis 2 and an arbitrary Y axis 3, at right angles thereon in a direction perpendicular to the plane of axes 2 and 3. That is to say, the transparency of screen 1 is uniform along hyperbolic lines drawn with respect to axes 2 and 3, being great at points corresponding to large ordinates and abscissae in the first and third quadrants, and small at points corresponding to large ordinates and abscissae in the second and fourth quadrants as shown. Stated another way, the transparency of screen 1 is made to satisfy the expression $$T = T_0 + kXY \qquad (a)$$

where

T represents the transparency of screen 1 at any point thereon, $T_0$ represents the transparency of screen 1 at the origin of and along axes 2 and 3, X represents the abscissa of the point, Y represents the ordinate of the point, and k represents an arbitrary constant.

It will be seen from the expression (a) that the transparency of screen 1 along either axis 2 or axis 3 is some intermediate value, $T_0$, but that the transparency is parabolically increased or decreased in the first and third, and the second and fourth quadrants respectively along 45° lines extending from the origin, all the while satisfying hyperbolic contours at other points.

As shown in Fig. 1, screen 1 is placed in front of a cathode ray tube 4, with its axes 2 and 3 aligned with the horizontal and vertical deflection axes of cathode ray tube 4, to receive, modulate, and transmit light received from cathode ray tube 4. Cathode ray tube 4 may be of a conventional type, having a cathode 5, an accelerating anode 6, vertical deflection plates 7 and 8, and horizontal deflection plates 9 and 10. To complete the illustration, a source of heating current, such as the battery 11, for cathode 5, together with a source of accelerating potential, such as a battery 12 for anode 6, is shown, and certain points are indicated as being connected to ground for convenience and to establish a point of zero reference potential. In a well-known manner, cathode 5 produces a beam of electrons which are accelerated by anode 6, pass therethrough, and which are deflected by the deflecting plates before striking a luminescent face 13 to produce an illuminated spot or trace thereon. Input terminals 14 and 15 are provided through which a first time-varying input signal or voltage $S_1$ may be applied to deflection plates 7 and 8 and, similarly, input terminals 16 and 17 are provided through which a second time-varying input signal or voltage $S_2$ may be applied to deflection plates 9 and 10.

A photoelectric cell 18 is positioned to receive light of varying intensity transmitted by screen 1, and to produce a corresponding varying output voltage signal, which may be amplified by an amplifier 19. A biasing source 20, such as the battery illustrated, may be connected to bias the output of amplifier 19 so that when the electron beam falls behind axis 2 or 3, i. e., at a point where the transparency of screen 1 is $T_0$, the voltage appearing across output terminals 21 and 22 is zero. Shown by dashed lines in Fig. 1 are a means to cyclically vary the intensity of the electron beam in cathode ray tube 4, such as an alternating voltage source 23 connected in series with battery 12, and a demodulator 24 connected between amplifier 19 and source 20, both of which are not necessary to the multiplier but which may be employed with advantage as will be hereinafter explained.

Assuming for the moment that source 23 and demodulator 24 are not used in Fig. 1, the operation of the multiplier may be described as follows:

Input signals $S_1$ and $S_2$ are supplied to deflection plates 7—8 and 9—10 respectively to correspondingly deflect the electron beam produced by cathode 5 and anode 6 along axes 3 and 2 respectively. The electron beam, however, in striking luminescent face 13 produces means, i. e., a light beam, responsive to the hyperbolically contour property, i. e., transparency, of screen 1. The light beam is readily adapted by the use of cathode ray tube 4 to be moved along axis 3 in accordance with first time-varying input signal $S_1$ and to be moved along axis 2 in accordance with second time-varying input signal $S_2$ as explained. The light beam from cathode ray tube 4 received by screen 1 is thus of constant intensity but its point of impact on screen 1 is controlled by the input signals $S_1$ and $S_2$. The intensity of the light transmitted by screen 1 and received by photoelectric cell 18 is dependent upon the position of the light beam, since the transparency of screen 1 is varied as hereinbefore described. It will be readily seen that the light received by cathode ray tube 18, relative to the light received when the light beam strikes screen 1 at a point where the transparency is $T_0$, is directly proportional to the product of the two input signals $S_1$ and $S_2$. Since photoelectric cell 18 produces a voltage output essentially proportional to the light it receives, its voltage output, which is amplified by amplifier 19, relative to the voltage output produced when the light beam strikes screen 1 at a point where the transparency is $T_0$, is also directly proportional to the product of the two input signals, $S_1$ and $S_2$. Source 20 is made equal and opposite the voltage output of amplifier 19 when the light beam strikes screen 1 at a point where the transparency is $T_0$, so that the resulting signal or voltage output from output terminals 21 and 22 is directly proportional to the product $S_1S_2$, being positive in polarity when $S_1$ and $S_2$ are of like sign, negative in polarity when they are of unlike sign, and zero when either $S_1$ or $S_2$ is zero and the light beam strikes screen 1 at a point where the transparency is $T_0$.

Without the use of alternating source 23 and demodulator 24, amplifier 19 must, of course, be a D.-C. amplifier. I prefer to add source 23 and demodulator 24 in order that amplifier 19 can be an A.-C. amplifier, since ordinary economical D.-C. amplifiers are often unreliable and subject to drift. The operation of the multiplier is essentially the same except that the intensity of the electron beam in cathode ray tube 4 is varied cyclically at a relative high frequency. The light beam of cyclically varying intensity transmitted by screen 1 is then a light beam of alternating intensity modulated by the varied transparency of screen 1 with a signal proportional to the product of input signals $S_1$ and $S_2$. Similarly, the voltage output of photoelectric cell 18 is an alternating voltage modulated with a signal proportional to the product of $S_1$ and $S_2$, which may be amplified by amplifier 19 and demodulated by demodulator 24 to produce a varying direct-current voltage. Again, source 20 is adjusted to be equal and opposite the voltage output of demodulator 24 when the light beam strikes screen 1 at a point where the transparency is $T_0$, so that the time-varying output signal voltage appearing between output terminals 21 and 22 is directly proportional to the product of the input signals $S_1$ and $S_2$.

It will be apparent that the speed of response of the multiplier illustrated by Figs. 1 and 2 is high and that the input signals and output signal may be repeated at a rapid rate, say, 60 times per second, so that the output of the multiplier, or any solution voltage signal developed therefrom, may be viewed as a stationary curve on a cathode ray tube face. This is particularly desirable in fast electrical computing devices, such as electronic analogue computers. Further, this multiplier is capable of four quadranat operation, so that the input and output signals may be either positive or negative with complete accuracy of multiplication. This multiplier, however, is simple in construction, requiring no feed-back loops, double-modulation circuits, or critical vacuum tube characteristics essential to electronic multipliers used heretofore.

Turning now to Fig. 3, I have shown a second embodiment of my invention which is an electromechanical multiplier. This embodiment includes an element 25 which is electrically resistive in nature. A set of Cartesian axes, such as an X axis 26 and a Y axis 27 at right angles thereto, are arbitrarily defined on element 25 and the resistive characteristic is varied in hyperbolic contours with respect to axes 26 and 27 in a direction perpendicular to the plane of axes 26 and 27, i. e., between the upper and lower surfaces of element 25. Hereafter in this specification, the term "resistance" as applied to element 25 is used in the sense of the resistance from any point on the upper surface of element 25 to the lower surface of element 25. Thus, the resistance of element 25 is varied to satisfy the expression $$R = R_0 - kXY \qquad (b)$$

where

R represents the resistance of element 25 at any point,
$R_0$ represents the resistance of element 25 at the origin of and along axes 26 and 27,
X represents the abscissa of the point with respect to the origin,
Y represents the ordinate of the point with respect to the origin, and
k represents an arbitrary constant.

Expression (b), in a manner similar to expression (a), indicates that the resistance of element 25 increases parabolically relative to $R_0$ along 45° lines extending from the origin into the second and fourth quadrants and decreases parabolically relative to $R_0$ along 45° lines extending into the first and third quadrants, while the hyperbolic contours of resistance variation are satisfied at all other points. To effect this resistance variation in element 25, the materials used therefor may be of uniform resistivity and the thickness of element 25 varied in hyperbolic contours as shown by Fig. 3. However, it is also possible to make resistance element 25 of uniform thickness and to vary the resistivity of the material theren in hyperbolic contours to achieve the same resistance variation.

Means responsive to the varied resistance characteristic of element 25, such as an electrical pickup 28 riding on the upper surface of resistance element 25 and connected in an electrical circuit, is adapted by some cam arrangement or servomechanism, not shown, such as any of those well known in the art to be moved along one axis, say axis 26, in accordance with a first mechanical time-varying input signal or motion designated by $S_3$ and, similarly, resistance element 25 is adapted to be moved by a cam arrangement or servomechanism, not shown, along the other axis, axis 27, in accordance with a second mechanical time-varying input signal or motion designated by $S_4$. Thus, relative to resistance element 25, pickup 28 is adapted to be moved over the upper surface of element 25 along first and second axes 26 and 27, in accordance with first and second mechanical input signals $S_3$ and $S_4$, respectively. An electrical circuit including resistance element 25 and pickup 28 is provided to produce an electrical output signal which is instantaneously proportional to the product of input signals $S_3$ and $S_4$ by sensing the varying resistance of element 25 due to those signals. One such circuit, in simple form, may include a voltage source, such as a battery 29, and a resistor 30 connected in series with element 25 and pickup 28 as shown. Output terminals 31 and 32 are connected to a tap on battery 29 and one side of resistor 30 as shown by Fig. 3, the voltage tapped from battery 29 by terminal 31 being equal and opposite the voltage appearing across resistance 30 when pickup 28 rests on resistance element 25 at a point where its resistance is $R_0$, i. e., along either axis 26 or 27. Thus, when pickup 28 senses a resistance of $R_0$ across element 25, the output voltage across terminals 31 and 32 is zero. As pickup 28 is moved over element 25 in accordance with input signals $S_3$ and $S_4$, the resistance of element 25 in the electrical circuit varies, relative to $R_0$, inversely as the product of $S_3$ and $S_4$ as is evident from expression (b), so that the output signal voltage across terminals 31 and 32 is directly proportional to the product of $S_3S_4$, being positive when both $S_3$ and $S_4$ are of like sign with respect to the origin of axes 26 and 27, and being negative when either $S_3$ and $S_4$ are of unlike sign.

This electromechanical embodiment illustrated by Fig. 3 is not a fast acting multiplier as compared with the embodiment of Figs. 1 and 2, but it is not desirable that it should be fast, since most computing devices employing mechanical signals are relatively slow acting. However, the multiplier illustrated by Fig. 3 is one which produces an electrical output product signal in response to two mechanical input signals and it is further characterized by extreme simplicity and economy of construction.

Referring next to Fig. 4, I have shown a third embodiment of my invention which is a mechanical multiplier suited for use with mechanical computing devices such as mechanical differential analyzers. This embodiment includes an element, such as a cam 33, having the characteristic of elevation of its surface 33a varied in hyperbolic contours with respect to a set of Cartesian axes, such as an X axis 34 and a Y axis 35 at right angles thereto, arbitrarily defined on surface 33a. That is, relative to the origin of axes 34 and 35, the elevation of cam surface 33a is greater in the first and third quadrants and less in the second and fourth quadrants, being equal along each of a family of hyperbolic lines. In other words, the elevation or height of cam surface 33a is made to satisfy the expression $$H = H_0 + kXY \qquad (c)$$

where

H represents the elevation of any point on the cam surface,
$H_0$ represents the elevation of the cam surface at the origin of and along axes 34 and 35,
X represents the displacement of the point from axis 35 along axis 34,
Y represents the displacement of the point from axis 34 along axis 35, and
k represents an arbitrary constant.

It will be seen from the expression (c), which is similar to expressions (a) and (b), that the elevation of the cam surface 33a increases parabolically along 45° lines drawn from the origin into the first and third quadrants and decreases parabolically along 45° lines drawn from the origin into the second and fourth quadrants, all the while satisfying the requirement of equi-elevation along each of a family of hyperbolic lines drawn with respect to axes 34 and 35.

Means responsive to the varied elevation characteristic of cam 33, such as a cam follower 36 which may be biased against cam surface 33a by a spring 37, are provided and adapted to be moved relative to cam surface 33a along one axis, say axis 34, in accordance with a first mechanical time-varying input signal $S_5$ and along the other axis, axis 35, in accordance with a second mechanical time-varying input signal $S_6$. A convenient way of effecting this relative movement is to horizontally support follower 36 in a sleeve-like member 38, and to adapt member 38 to be driven along axis 34 in accordance with signals $S_5$ by a cam arrangement or servomechanism, not shown, such as any of those well known in the art, and to similarly adapt cam 33 to be driven along axis 35 in accordance with signal $S_6$ by a cam arrangement or servomechanism, not shown.

It will be seen from expression (c) that the height of an output member 39 attached to follower 36 is instantaneously proportional to the product of input signals $S_5$ and $S_6$, such height being measured relative to the position of member 39 for which follower 36 rests on cam surface 33a at points on axes 34 and 35, i. e., at points for which the elevation is $H_0$. Thus, the time-varying mechanical output signal or vertical displacement of follower 36 and thus of output member 39 is at all times proportional to the product of input signals $S_5S_6$, being positive when both $S_5$ and $S_6$ are of like sign, and negative when either $S_5$ and $S_6$ are of unlike sign.

If it is desired to procure from this embodiment of the multiplier an electrical time-varying output product signal, means to convert the mechanical output signal to an electrical output signal comprising a slidable resistance tap 40 pivotally mounted on member 38 to engage a uniformly wound resistor 41 and connected for actuation to follower 36 as shown in the drawing may be provided. An electrical circuit, similar to the circuit shown in Fig. 3, having a supply voltage battery 42 and a resistor 43 connected in series with the tapped portion of resistor 41, completes the conversion means, the electrical product output signal being taken from output terminals 44 and 45 connected to a tap on battery 42 and one side of resistor 43 as shown. The voltage tapped from battery 42 by terminal 44 is equal and opposite to the voltage appearing across resistor 43 when output member 39 is at reference elevation, i. e., when follower 36 engages cam surface 33a at a point for which the elevation is $H_0$. Then, as follower 36 is moved vertically upward as a result of input signals $S_5$ and $S_6$, the voltage output between terminals 44 and 45 increases proportionately, i. e., terminal 44 becomes positive with respect to terminal 45, and, conversely, as follower 36 is moved downwardly, the output voltage between terminals 44 and 45 becomes proportionally negative.

From the foregoing description of three embodiments for a multiplier yielding an output signal proportional to the product of two input signals, it will be apparent to those skilled in the art that the varied characteristics, i. e., transparency, resistance, and cam surface elevation, of the various elements may be varied in predetermined manners other than those described to produce, in the same way, output signals proportional to a more complex function of the two input signals. Thus, by properly contouring the varied characteristic of the multiplier element in a given manner, a predetermined time-varying output signal proportional to $S_7S_8^2$, $S_7^2S_8^2$, or, more generally, $S_7^mS_8^n$ where $m$ and $n$ represent any numerical exponents, may be obtained for two time-varying input signals $S_7$ and $S_8$. If it is known that an output signal corresponding to a given complex function of the input signals, say $S_7^2S_8^2$, will be used frequently, it may well be practical to provide a multiplying element having a characteristic contoured to produce that output. However, the same result may be obtained, it will be seen, by multiplying two input signals $S_7$ and $S_8$ in a multiplier such as described hereinbefore, obtaining an output signal $S_7S_8$ and applying it to both inputs of a second such multiplier to obtain a second output signal $S_7^2S_8^2$.

Further, in cases where it is desirable to do so, any complex function of two vairables, including exponents, sums, differences, etc. may be represented by a properly varied characteristic of a multiplier element. It is conceivable, therefore, that a multiplier element having a characteristic varying in a selected manner, say, in accordance with a selected mathematical expression, may yield an output signal dependent in a predetermined relation on the two input signals. For example, by selecting the proper manner of the characteristic variation, an output signal proportional to a function of X and Y, such as $$F(xy) = (X^3 + XY^2 - Y/2 + 3)$$

may be obtained from two input signals X and Y.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. An electromechanical multiplier for computing devices comprising a resistance changing element having a characteristic varying transversely thereof parabolically in hyperbolic contours with respect to an arbitrary set of Cartesian axes which intersect one another forming four compartments on said element, said characteristic increasing in one pair of diagonally opposite compartments and decreasing in the other pair of diagonally opposite compartments along lines extending from the intersections of said axes and said characteristic being constant along said axes and any one of said hyperbolic contours, and electromechanical means responsive to said characteristic of said element adapted to be relatively moved along one of said axes in accordance with a first time-varying input signal and along the other of said axes in accordance with a second time-varying input signal, said means having a response proportional to the product of said first and said second time-varying input signals.

2. An electromechanical multiplier for computing devices having four quadrant operations where one or both input signals may have positive or negative values, said multiplier comprising a resistance element having two opposed surfaces and an arbitrary set of intersecting perpendicular axes defined thereon, the resistance at any point on said element between said two surfaces of said element in a direction perpendicular to the plane of said axes being varied in accordance with the expression $$R = R_0 - kXY$$

where

R represents the resistance at any point on said element between two surfaces of said element,
$R_0$ represents the resistance between said surfaces along and at the intersection of said axes,
X represents the distance of said point from said intersection measured along one of said axes,
Y represents the distance of said point from said intersection measured along the other of said axes, and
$k$ represents an arbitrary constant, an electrical pickup adapted to be moved relative to said one of said surfaces of said element along one of said axes in accordance with a first time-varying mechanical input signal and along the other of said axes in accordance with a second time-varying mechanical input signal, an electrical circuit including said resistance element in a direction perpendicular to the plane of said axes, said pickup, a source of electrical voltage and a resistor, and output terminals connected across said resistor and a part of said voltage source to provide a voltage signal proportional to the product of said first and second mechanical input signals.

3. A mechanical multiplier for computing devices having four quadrant operations where one or both input signals may have positive or negative values, said multiplier comprising a cam having a surface with an arbitrary pair of perpendicular straight line axes defined thereon and intersecting at an origin, the perpendicular height of said cam surface relative to said origin satisfying the expression $$H = H_0 + kXY$$

where

H represents the height of any point on said surface,
$H_0$ represents the height of said surface at said origin and along said axes.
X represents the distance of said point from said origin measured along one of said axes,
Y represents the distance of said point from said origin measured along the other of said axes, and
$k$ represents an arbitrary constant, a mechanical follower for riding on said surface and adapted to be moved relative to said surface along one of said axes in accordance with a first time-varying mechanical input signal and along the other of said axes in accordance with a second time-carrying mechanical input signal, and means responsive to the movement of said follower in a direction perpendicular to the plane of said axes.

References Cited in the file of this patent

UNITED STATES PATENTS

| Number | Name | Date |
| --- | --- | --- |
| 1,542,534 | Schneider | June 16, 1925 |
| 1,707,274 | Morse | Apr. 2, 1929 |
| 2,114,330 | Borden | Apr. 19, 1938 |
| 2,452,664 | Koenig, Jr. | Nov. 2, 1948 |
| 2,458,829 | Bruce | Jan. 11, 1949 |
| 2,497,042 | Doll | Feb. 7, 1950 |
| 2,536,474 | Susdorf | Jan. 2, 1951 |

OTHER REFERENCES

"Relay Devices and Their Application to the Solution of Mathematical Equations"; H. Ziebolz; Askania Regulator Co.; Chicago, Illinois; 1940. Pages 36 and 37 of vol. 1 and Figure 100, page 26, of volume II relied upon.

Mechanical Computing Mechanisms, II, R. E. Reid and D. E. Stromback; "Product Engineering"; September 1949; page 119.